EDMUND J. POPIEL
*INVENTOR.*
BY John R. Faulkner
Clifford L. Sadler
ATTORNEYS

Oct. 31, 1961     E. J. POPIEL     3,006,426
VEHICLE AXLE CONSTRUCTION

Filed Aug. 20, 1959     3 Sheets-Sheet 3

EDMUND J. POPIEL
*INVENTOR.*

BY John R. Faulkner
Clifford L. Sadler

ATTORNEYS

United States Patent Office 3,006,426
Patented Oct. 31, 1961

3,006,426
VEHICLE AXLE CONSTRUCTION
Edmund J. Popiel, Detroit, Mich., assignor to Ford Motor Company, Dearborn, Mich., a corporation of Delaware
Filed Aug. 20, 1959, Ser. No. 834,997
1 Claim. (Cl. 180—22)

The present invention relates to differential gearing and more particularly to a novel drive-through differential for tandem axles in motor vehicles such as trucks.

Where there are parallel tandem axles provided for the driving of a vehicle, a problem exists in the method to be employed for the transmittal of power to both of the rear axles. In a conventional tandem axle vehicle, the engine is located over the front wheels and has a propeller shaft extending rearwardly therefrom which rotates about an axis approximately parallel to the longitudinal axis of the vehicle. Each of the rear driving axles is provided with a differential gear unit located near its midpoint. With this construction, the problem of connecting the propeller shaft to both of the differentials exists. The most common expedient is to use a transfer box at the first of the two differentials whereby power is brought into the transfer box and dropped down to the first differential. A second output shaft of the transfer box drives directly into the second differential. In effect, the extra gear group of the transfer box is required to transmit power from a single propeller shaft to two separate differentials.

In view of the foregoing state of the art, it is, therefore, the principal object of the present invention to provide a differential gear unit that is adapted to be used with tandem axles in which power shafting passes directly through one of the differentials without employing auxiliary gear units.

It is also an object of the present invention to provide a differential gear unit having a power output shaft directly connected to the power input shaft in addition to the left and right axle shafts.

It is another object of the present invention to provide a drive-through differential having a drive pinion which is vertically offset from the drive ring gear and differential carrier to sufficient extent so as to permit the pinion shaft to extend through the differential housing so that a second propeller shaft may be connected to the differential.

These and further objects of the present invention will become more apparent from the following description and the accompanying drawings in which.

Figure 1:
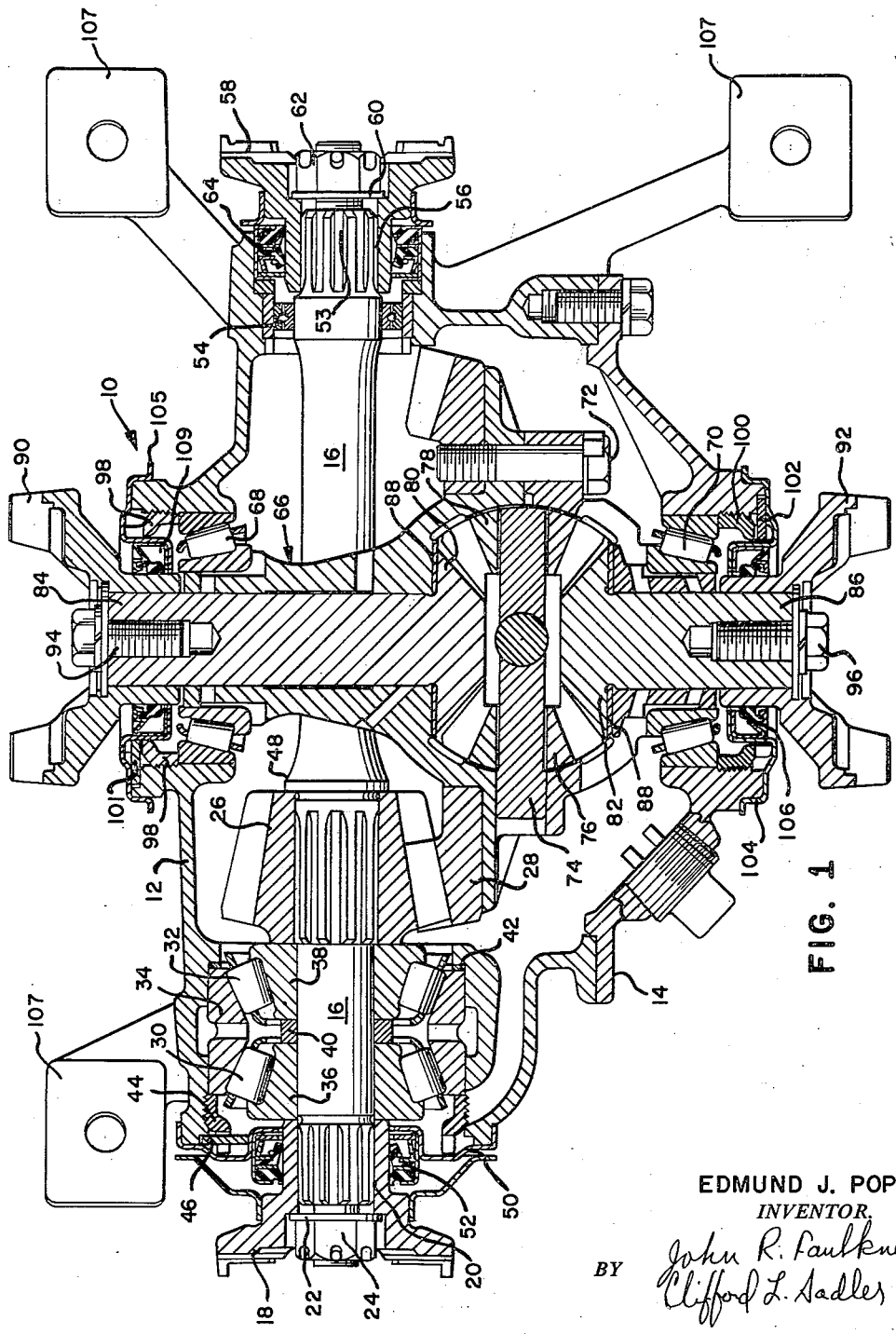
FIGURE 1 is a sectional view of a differential gear unit embodying the present invention.
Figure 2:
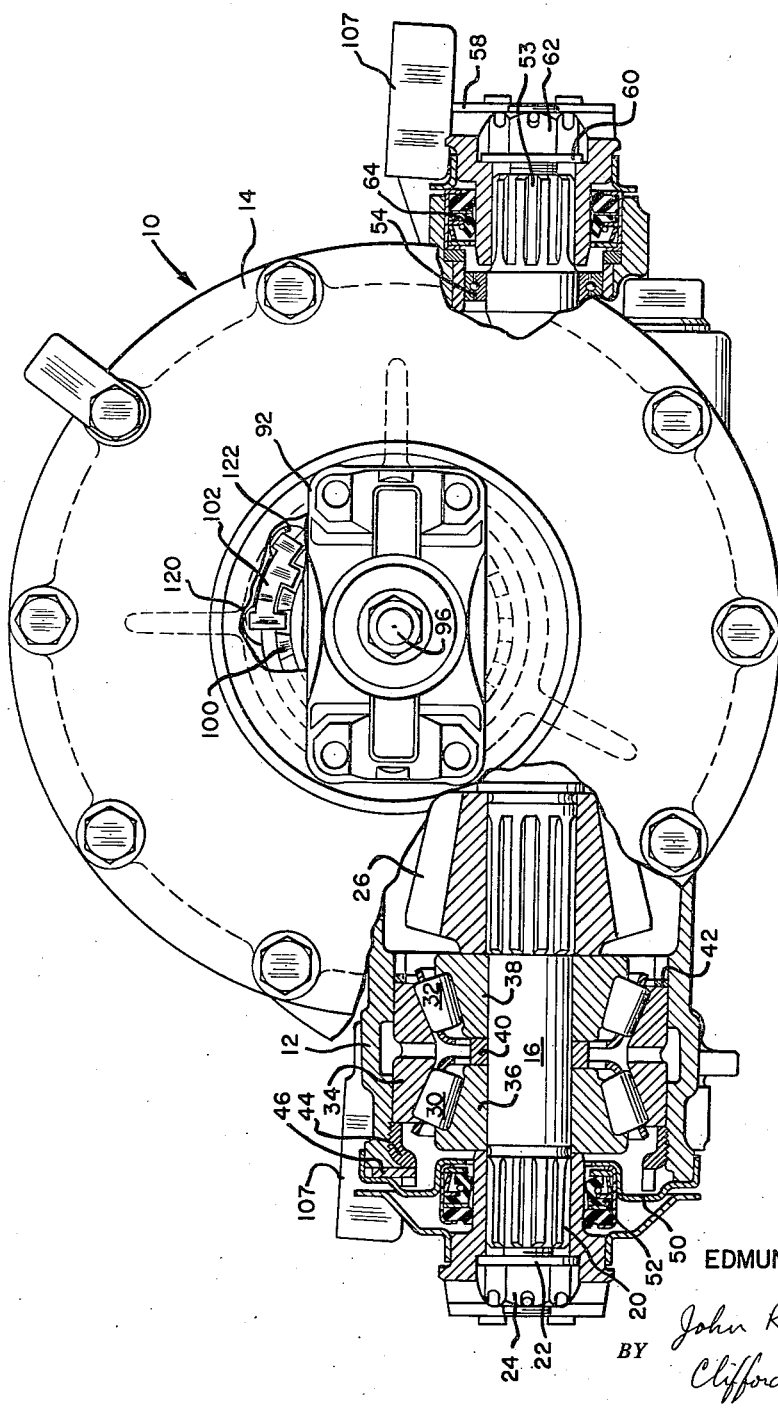
FIGURE 2 is an elevational view partly in section of the differential of FIGURE 1.

Referring now to FIGURE 1 of the drawings, a differential gear unit 10 is disclosed which incorporates the preferred embodiment of the present invention. The differential 10 is provided with a two-part housing 12 and 14 having a shaft 16 positioned therein which may be referred to as either a pinion shaft or a drive-through shaft in the following description. Shaft 16 and the differential gearing associated therewith is adapted to receive torque from the drive shaft of a prime mover by means of a universal joint, one flange of which is shown at 18. Flange 18 is splined at 20 to the left-hand end of the pinion shaft 16 and is secured thereto by a flat washer 22 and a nut 24. Spaced from the universal joint flange 18 and also splined to the pinion shaft 16 is a hypoid pinion gear 26 which engages a hypoid ring gear 28 of a differential carrier that will be later described in detail. Rotatably supporting the shaft 16 between the flange 18 and the hypoid pinion 26 is a span of anti-friction tapered roller bearings 30 and 32 which have a common outer race 34 and separate inner races 36 and 38.

A spacer ring 40 of preselected thickness is provided between the inner races 36, 38 for the preloading of the bearings 30, 32. The outer race 34 is seated in the housing 12 and is provided with a shim 42 of selected thickness to permit the desired axial placement of the pinion shaft 16. The outer race 34 is held securely within the housing 12 and tightly against the shim 42 by means of a castelated retaining nut 44 and a lock member 46 engageable therewith. The hypoid pinion 26 is located on the pinion shaft 16 by means of a shoulder 48. Washer 22 and nut 24 thus retain the flange 18, the race 36, spacer 40, race 38 and pinion 26 in their serial position on shaft 16 and exert the preload force which is on the bearings 30 and 32.

A stamped metal cover 50 is provided about the end of the housing 12. Cover 50 snaps in place to hold the lock member 46 in position and also to retain an oil seal 52.

The output end 53 of the pinion or drive-through shaft 16 is supported by a ball bearing 54 and is splined at 56 to receive a flange 58 of a universal joint. Flange 58 is secured by means of a washer 60 and a nut 62. An oil seal 64 is provided about the flange 58 for the retention of oil within the housing 12, 14.

A bipartite differential carrier 66 is supported by a span of tapered roller bearings 68 and 70. The two parts of the carrier 66 and the ring gear 28 are secured together by appropriate means such as bolts 72. It should be noted that the drive pinion 26 and ring gear 28 are of the hypoid type permitting the axis of rotation of the pinion gear 26 to be substantially vertically offset from the axis of rotation of the ring gear 28. This offset is sufficient to allow the shaft 16 to by pass the differential carrier 66 without mechanical interference.

Positioned within the carrier 66 is a differential pinion shaft 74 which rotatably supports a pair of pinions 76, 78 of the bevel gear type. Engaging the bevel pinions 76, 78 are a pair of side gears 80, 82 which are also necessarily of the bevel gear type and integral with the side gears 80, 82 are short connecting shafts 84, 86. Thrust washers 88 are interposed between the side gears 80, 82 and the differential carrier 66. Flanges 90, 92 for universal joints are bolted at 94, 96 to the outer ends of the connecting shafts 84, 86 and they are employed as couplings to transmit power to the axles of the driving wheels for the vehicle using the differential 10.

The tapered roller bearings 68, 70 are secured in place by castelated retaining nuts 98 and 100 which are similar to nut 44 and in one physical embodiment of the invention are interchangeable therewith and similarly, locking members 101, 102 are interchangeable with locking member 46. Stamped metal covers 104, 105 and oil seals 106, 109 are provided about the flanges 90, 92 of the universal joints to hold the locking member in place and to retain lubricant within the housing 14 respectively.

The differential unit 10 embodying the present invention is of a type employed with independently sprung driving wheels. Unit 10 is bolted to the chassis of the vehicle by using the brackets 107 and swing axles are attached at the universal flanges 90, 92.

Because of the retaining nuts 98, 100 are provided at its two extremes, axial positioning of the carrier 66 is allowable. Such adjustment is necessary in order that the hypoid ring gear 28 may be properly aligned with the hypoid pinion 26. Shims 42 are provided to permit the proper placement of shaft 16. It is absolutely necessary that the ring gear 28 and pinion 26 be in proper mesh in order to avoid abnormal gear tooth wear.

The required finite adjustment of the axial positions of the shaft 16 and carrier 66 is achieved by retaining nuts such as castelated nut 100 and nut lock 102. Lock 102 has an arcuate body portion and radially extending pairs of inner and outer tangs. One of the inner tangs is in alignment with one of the outer tangs and the other inner and outer tangs are circumferentially spaced apart, the angular spacing of the latter two tangs being equal to one half the spacing of the inner pair of tangs. Milled out slots 120, 122 are provided in the housing 14 and are engaged by the outer pair of tangs. The inner tangs engage the castelations of the nut 100. The respective engagement of the inner and outer tangs prevents the nut 100 from rotating. The lock 102 may be flopped over 180° to obtain positioning of the nut 100 in increments equal to one half of the angular spacing of the castelations.

Figure 3:
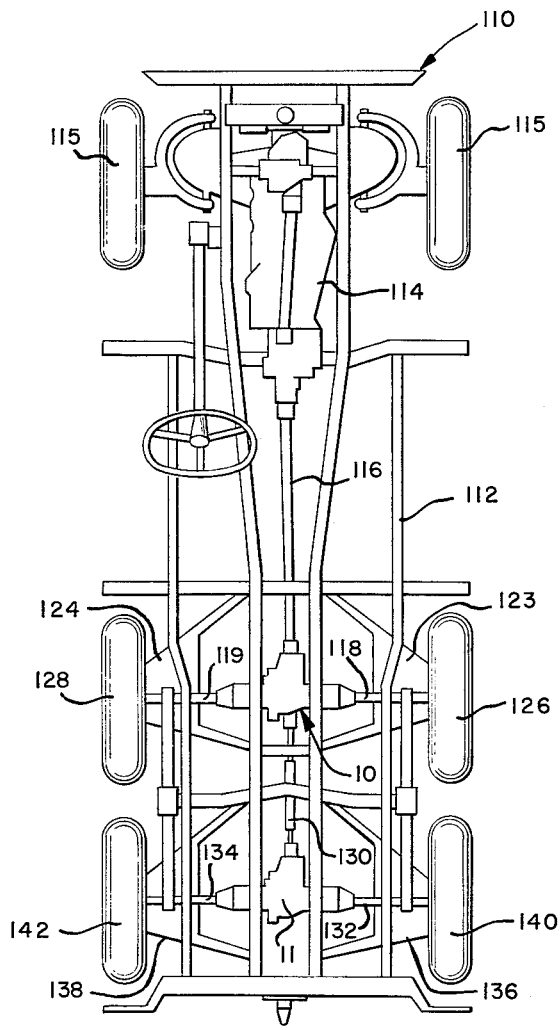
FIGURE 3 is a plan view of the chassis of a tandem axle vehicle containing differential units of the present invention.

Referring now to FIGURE 3, a truck chassis 110 is disclosed which incorporates the differential gear unit 10 of the present invention. The chassis 110 includes frame members 112 which support a vehicle engine 114 at its forward end near the front wheels 115. A driven propeller shaft 116 extends rearwardly along a line approximately parallel to the longitudinal axis of the vehicle. Secured by the brackets 107 to the vehicle frame 112 near its rear end is the differential 10 and extending to the left and right lateral sides of unit 10 are swing axles 118 and 119 which carry and drive road wheels 126, 128. Support arms 123 and 124 rotatably carry the wheel structure at their outer ends and are pivotally connected to the frame 112 at their inner ends for supporting the swing axles 118, 119 and the road wheels 126, 128 carried thereby. The propeller shaft 116 drives into the differential 10 by a connection to flange 18 and power is distributed by the differential gearing of carrier 66 in a conventional manner to the two axles 118, 119 and from there to the road wheels 126, 128.

Connected to the universal flange 58 of the drive-through shaft 16 is a second propeller shaft 130 which drives into a second differential 11 of conventional construction. Differential 11 is secured to the frame 112 in a manner similar to that of differential 10. Likewise, an independent suspension consisting of swing axles 132 and 134, support arms 136 and 138, and road wheels 140 and 142 are provided as described in connection with differential 10. Springs are provided for the support of each of the wheels 126, 128, 140, 142. Torque delivered to the differential 11 by the second propeller shaft 130 is portioned to the swing axles 132, 134 in a well-known manner.

The vehicle chassis of FIGURE 3 discloses a typical installation of the differential 10 of the present invention. Its simplicity of construction permits differentials for tandem axles to be positioned in axial alignment with the driving torque being transmitted directly through the first of the two differentials. This configuration eliminates the necessity for a transfer gear box or similar equipment to pass the power train over or around the first differential. In effect a gear unit is provided having an input shaft and three output shafts. Two of the output shafts are joined by differential gearing and the third is directly connected to the input. Insofar as the input shaft and two axle shafts are concerned, the unit 10 functions as a conventional differential with a splitting of torque between the two axle shafts.

The foregoing description constitutes the preferred embodiment of the present invention. However, other arrangements may occur to those skilled in the art which will come within the scope and spirit of the following claim.

I claim:

In a vehicle having a front mounted engine and a pair of rear mounted driving assemblies in tandem, said assemblies including a first differential rigidly secured to the chassis of said vehicle and having swing axles universally connected to output shafts extending from the sides of said differential, said differential having a longitudinal one piece shaft, a pinion gear directly splined to said shaft, a ring gear engaging said pinion gear, said ring gear being connected to said swing axles by differential gearing, said engine being connected to one end of said shaft, the other end of said shaft extending rearwardly through the housing of said differential, said assemblies including a second differential rigidly secured to said chassis and in longitudinal alignment with said first differential, swing axles extending laterally from the sides of said second differential, a shaft connecting said other end and the input of said second differential.

References Cited in the file of this patent

UNITED STATES PATENTS

| | | |
|---|---|---|
| 1,856,748 | Davis | May 3, 1932 |
| 1,885,508 | Brozincevic | Nov. 1, 1932 |
| 2,267,562 | Higgins | Dec. 23, 1941 |
| 2,291,174 | Stewart | July 28, 1942 |
| 2,589,844 | Moore | Mar. 18, 1952 |
| 2,699,075 | Buckendale | Jan. 11, 1955 |